Figure 1:
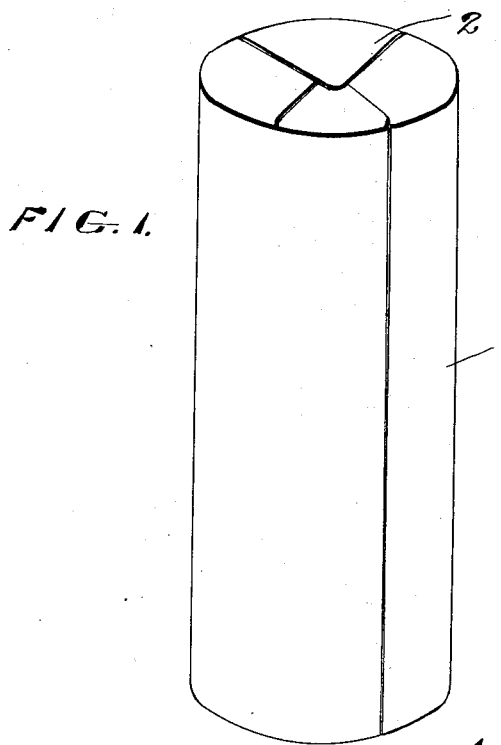

F. G. DOKKENWADEL.
INSECTICIDAL FERTILIZER CARTRIDGE.
APPLICATION FILED OCT. 5, 1909.

1,038,316.

Patented Sept. 10, 1912.

WITNESSES
C. K. Dawes
L. A. Shannon

INVENTOR
F. G. Dokkenwadel
by Brock, Becker & Smith
Att'ys.

UNITED STATES PATENT OFFICE.

FREDERICK G. DOKKENWADEL, OF COSHOCTON, OHIO.

INSECTICIDAL-FERTILIZER CARTRIDGE.

1,038,316. Specification of Letters Patent. Patented Sept. 10, 1912.

Application filed October 5, 1909. Serial No. 521,032.

*To all whom it may concern:*

Be it known that I, FREDERICK G. DOKKENWADEL, a citizen of the United States, and a resident of the city of Coshocton, in the county of Coshocton and State of Ohio, have invented a certain new and useful Insecticidal-Fertilizer Cartridge, of which the following is a specification.

My invention relates to a novel composition and form of fertilizer specially intended for use in connection with fruit, shade and ornamental trees and shrubbery.

I have found that when fertilizer is supplied in bulk to vegetation of this class, it is frequently improperly used, because too much or too little of the fertilizer is apt to be applied at a given place in the soil. To obviate this difficulty I make up my fertilizer in the form of "pills" or cartridges, which contain a practically uniform amount of fertilizing material and which may be used with certain results according to directions which may be furnished to the consumer.

My fertilizing "pills" or cartridges are put in use by making a suitable number of holes in the soil around the tree or shrub to be treated and placing one of the cartridges in each of the holes. As soon as the cartridges are placed in position a quantity of water is poured on each one. When the cartridge is moistened the fertilizing material contained in it is gradually disseminated through the soil and is taken up directly by the roots of the trees and the shrub. This gradual distribution from the fertilizer to the plant continues for a long period and in many cases for three or four years or more depending on the character of the soil and other conditions.

In addition to the particular form of my fertilizer cartridge I find that it is highly important to incorporate in a fertilizer for trees and shrubs an insecticide which will destroy insects and larvæ in the ground about the plant roots. An important feature of my invention, therefore, consists in incorporating in the fertilizing material in the cartridge a suitable proportion of any approved insecticidal agent, such for example, as kerosene, or crude carbolic acid. The insecticidal agent is thoroughly incorporated with the other ingredients of the fertilizer and as the fertilizer is disseminated through the soil the insecticide is also carried with it effectually freeing the ground around the roots from insects and preventing the subsequent formation of scale upon the tree or shrub.

It has been found by actual tests of my fertilizer that it produces very advantageous effects. I have added five and one-half feet to the growth of peach trees within six weeks by the judicious use of the fertilizer cartridge. This advantageous result is brought about by the combined effect of the fertilizer applied in the exactly correct quantities and the insecticide which is incorporated with it. The insecticide destroys insects in the soil, thus preventing destruction in the plant roots and permitting the fertilizer to have full effect in nourishing the tree or shrub and the vigorous growth of the plant thus resulting enables it to readily throw off scale.

In the accompanying drawing I illustrate exemplifying forms of the invention, but it is to be understood that the invention is capable of embodiment in other forms.

Figure 2:
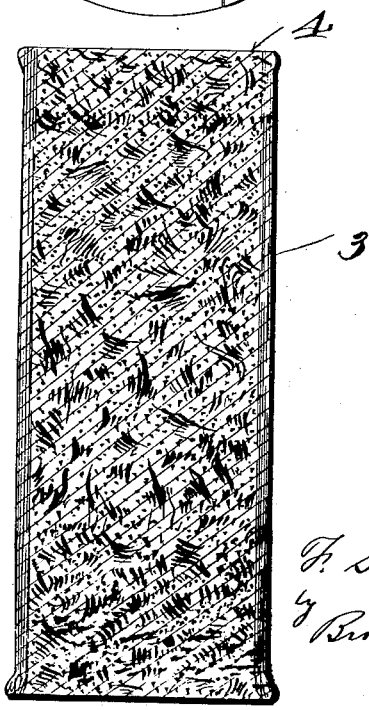

Figure 1 is a perspective of one form of my fertilizing cartridge; and Fig. 2 is a longitudinal section of another form.

Referring first to Fig. 1, reference character 1 designates an envelop or carton, which may conveniently be of paper shaped into cylindrical form and folded at the ends as at 2. The carton may be filled with any suitable character of fertilizing material, but my improved fertilizing material is generally employed consisting of any suitable base and active fertilizing agents in which is incorporated an insecticide such as kerosene, crude carbolic acid, etc. The cartridge is put in use simply by inserting it in a hole in the soil and tearing off the upper end of the paper and pouring a quantity of water upon the cartridge to soften the fertilizing material.

In Fig. 2, is shown another form of the cartridge consisting of a section of corn stalk comprising the stem 3 and the pith 4, which is impregnated with the fertilizing agent. This form of the cartridge provides a cellulose base for the active fertilizing agent, which suffices to prevent too rapid dissemination of the fertilizing material through the soil. This form of cartridge is only slowly destroyed by the action of the elements and gives effective service for a long time after it is put in the ground.

5 Having described my invention, I claim:

A fertilizer cartridge consisting of a joint-section of corn-stalk retaining its natural pith, the pith being thoroughly impregnated with fertilizing material.

FREDERICK G. DOKKENWADEL.

Witnesses:
 CHAS. E. RIORDON,
 D. W. SMITH.